United States Patent [19]

Wenzel et al.

[11] Patent Number: 4,497,342
[45] Date of Patent: Feb. 5, 1985

[54] FLEXIBLE RETRACTABLE COLD WATER PIPE FOR AN OCEAN THERMAL ENERGY CONVERSION SYSTEM

[75] Inventors: James G. Wenzel, Saratoga; Lloyd C. Trimble, San Jose, both of Calif.

[73] Assignee: Lockheed Missiles & Space Company, Inc., Sunnyvale, Calif.

[21] Appl. No.: 505,832

[22] Filed: Jun. 20, 1983

[51] Int. Cl.$^3$ .................. E02D 23/08; E01G 4/04; E02B 9/00
[52] U.S. Cl. .................. 137/565; 138/106; 138/118; 405/52; 405/195
[58] Field of Search .................. 137/565; 98/DIG. 7; 138/118, 106; 405/52, 195, 166, 158

[56] References Cited

U.S. PATENT DOCUMENTS

| | | | |
|---|---|---|---|
| 1,871,034 | 8/1932 | Boucherot et al. | 405/158 |
| 2,452,941 | 11/1948 | Little | 98/DIG 7 |
| 2,827,268 | 3/1958 | Staaf | 405/52 |
| 3,822,558 | 7/1974 | Blankenship | 405/168 |
| 4,298,295 | 11/1981 | Bozzo et al. | 405/52 |

OTHER PUBLICATIONS

Trimble, Lloyd C., Engineering Aspects of OTEC Systems, Society of Naval Architects and Marine Engineers, May 25-27, 1977.

Primary Examiner—Alan Cohan
Assistant Examiner—John A. Rivell
Attorney, Agent, or Firm—John J. Morrissey

[57] ABSTRACT

A cold water pipe (11) for an ocean thermal energy conversion (OTEC) system comprises a tubular membrane (12) made of a fabric such as a canvas, which is substantially impervious to flowing water. A proximal end of the pipe (11) is secured to a surface structure such as a ship (10), and a distal end of the pipe (11) is extendible from the surface structure to a selected ocean depth. The pipe (11) functions as a conduit through which cold water from the selected ocean depth can be drawn to the surface structure for use in a thermodynamic process of the OTEC system. The distal end of the pipe (11) can be quickly retracted to the surface structure when it becomes desirable to move the surface structure.

18 Claims, 20 Drawing Figures

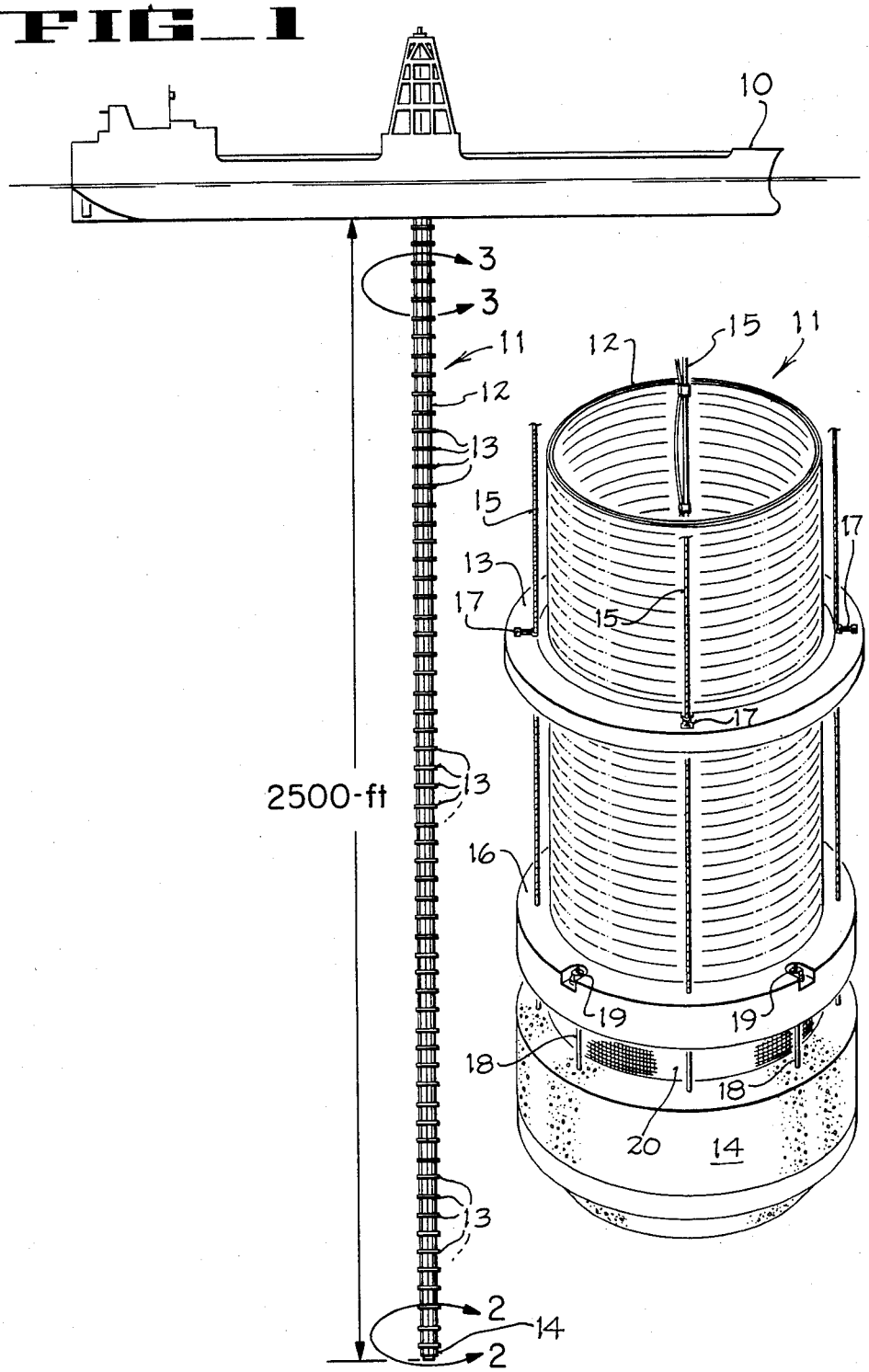

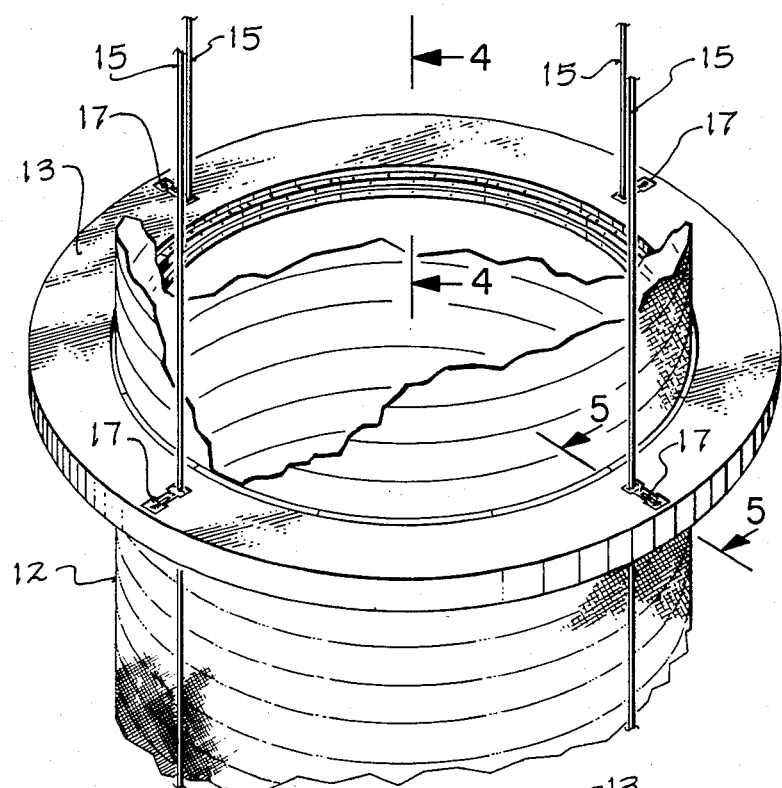
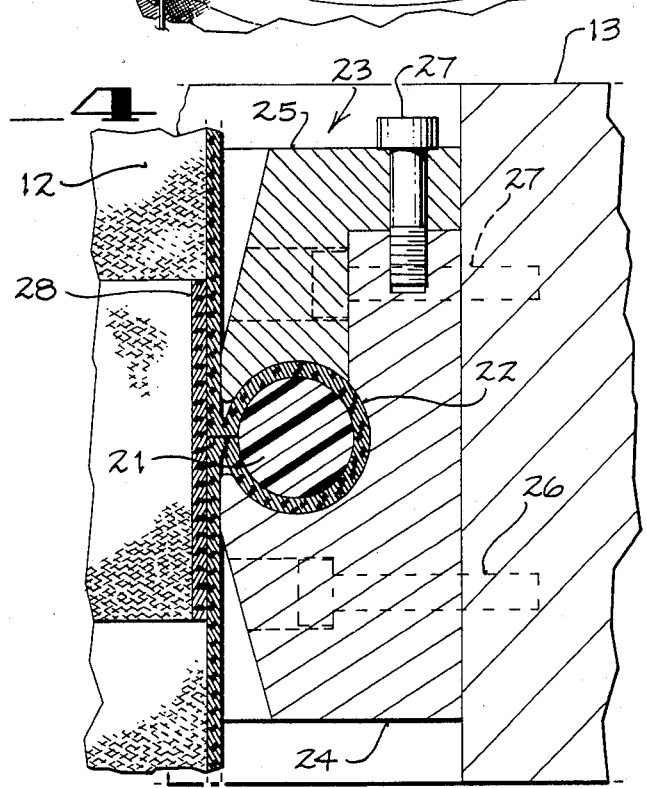

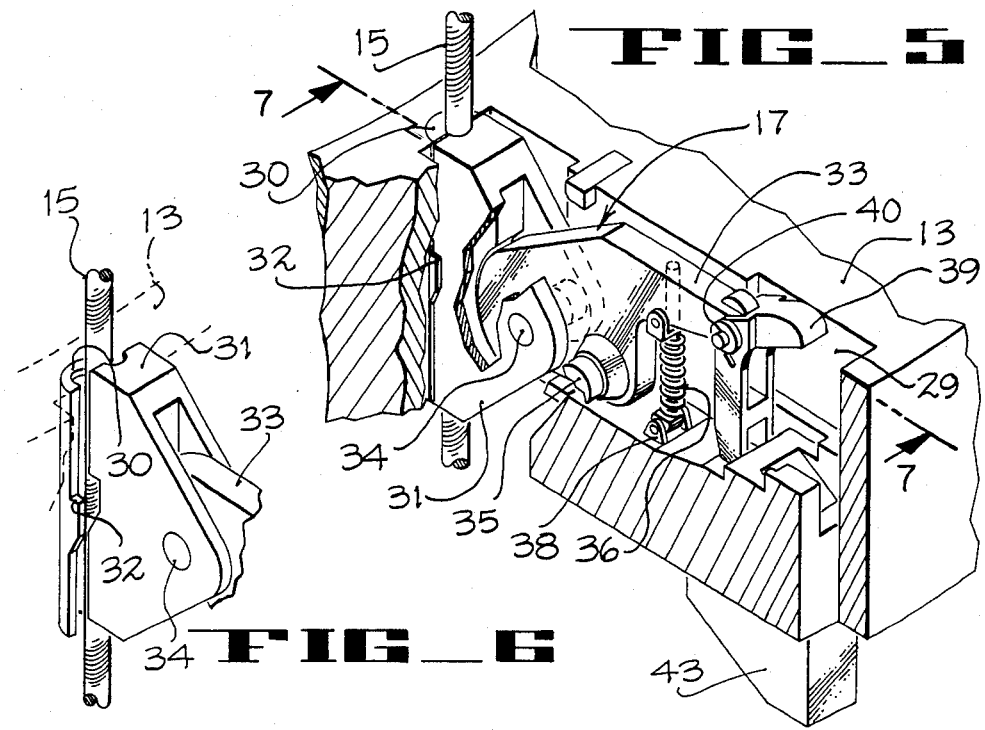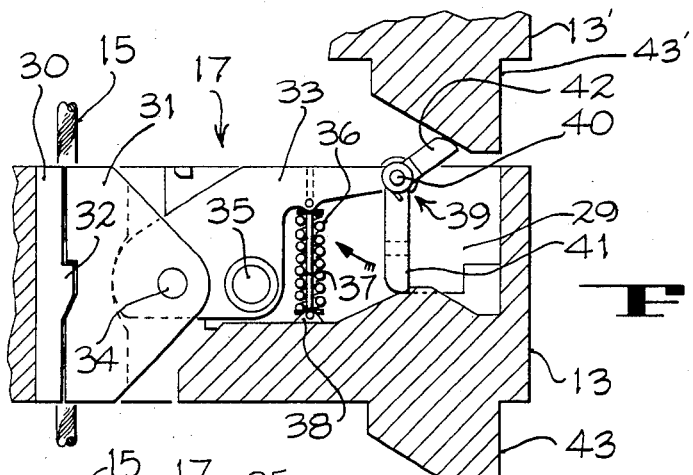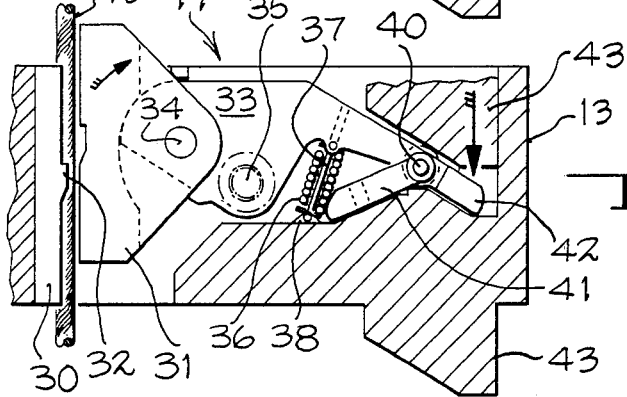

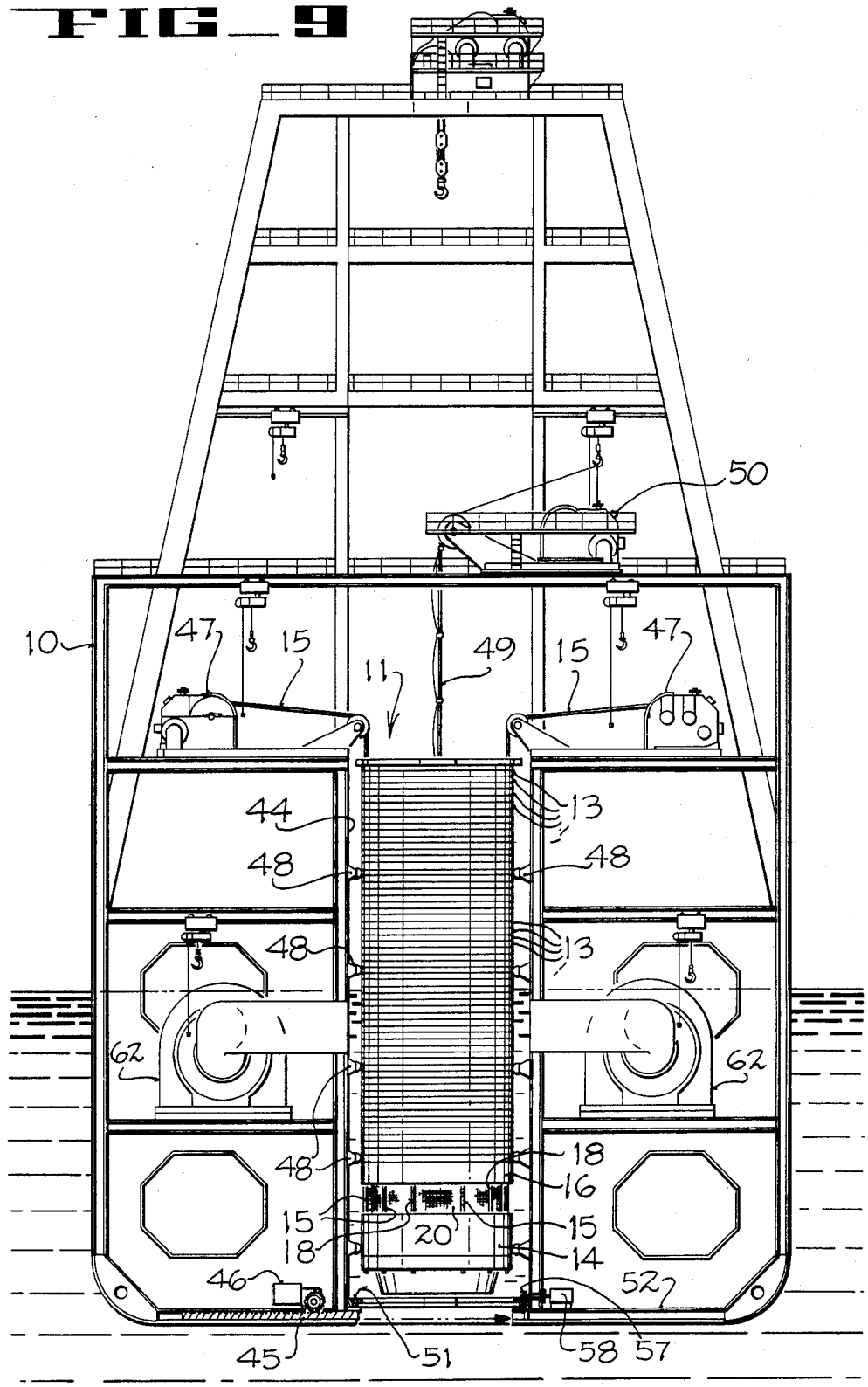

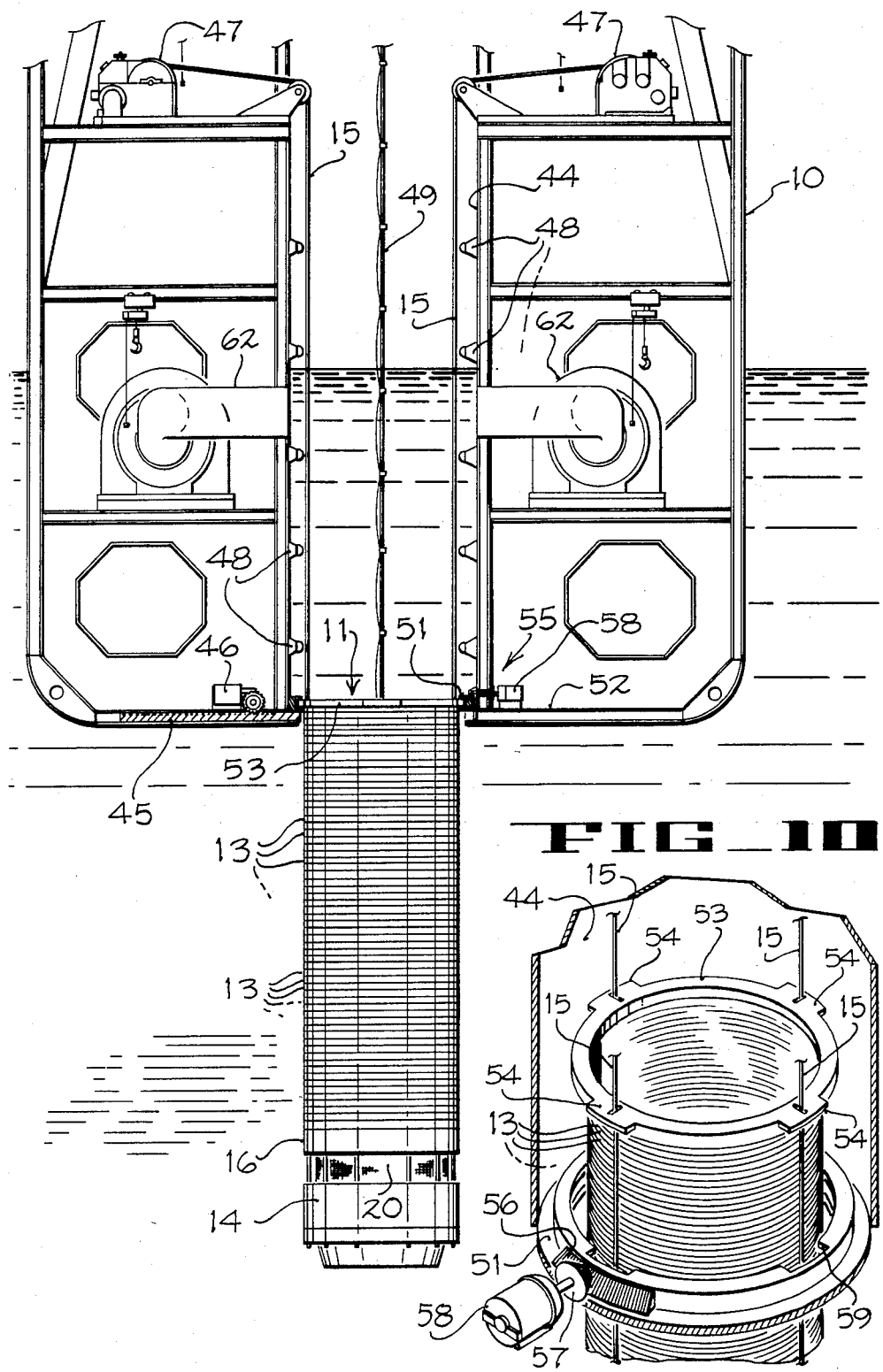

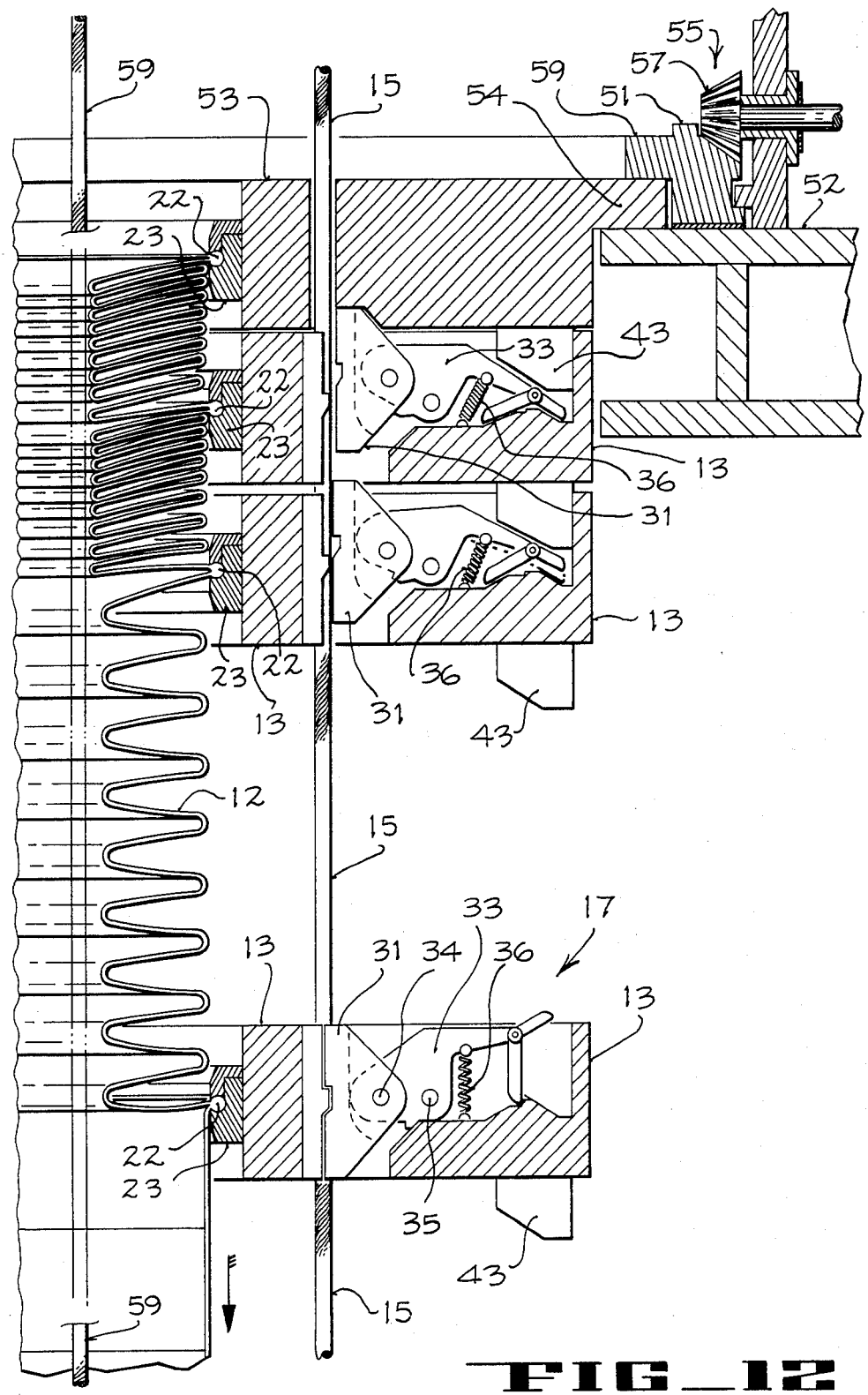
FIG_12

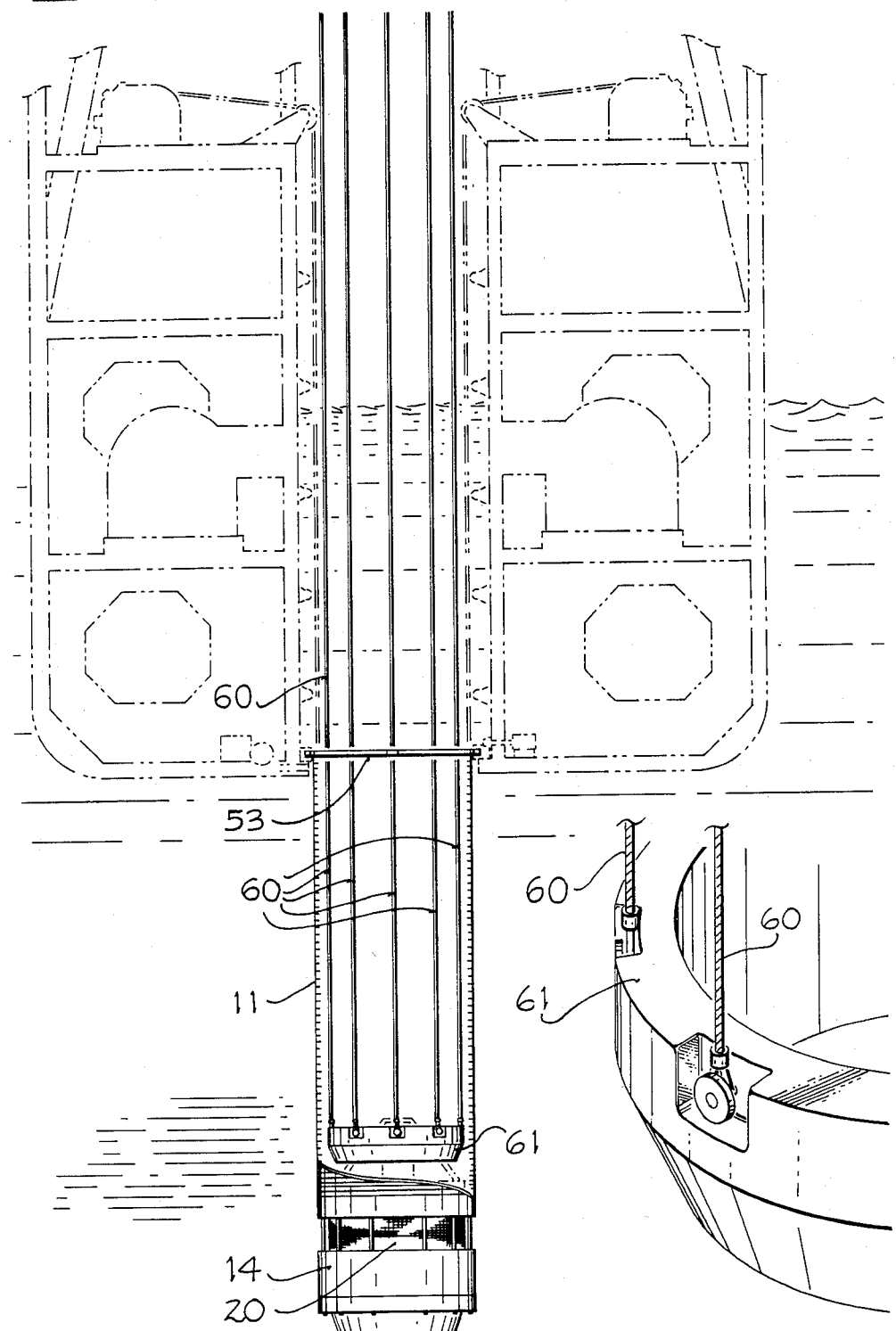

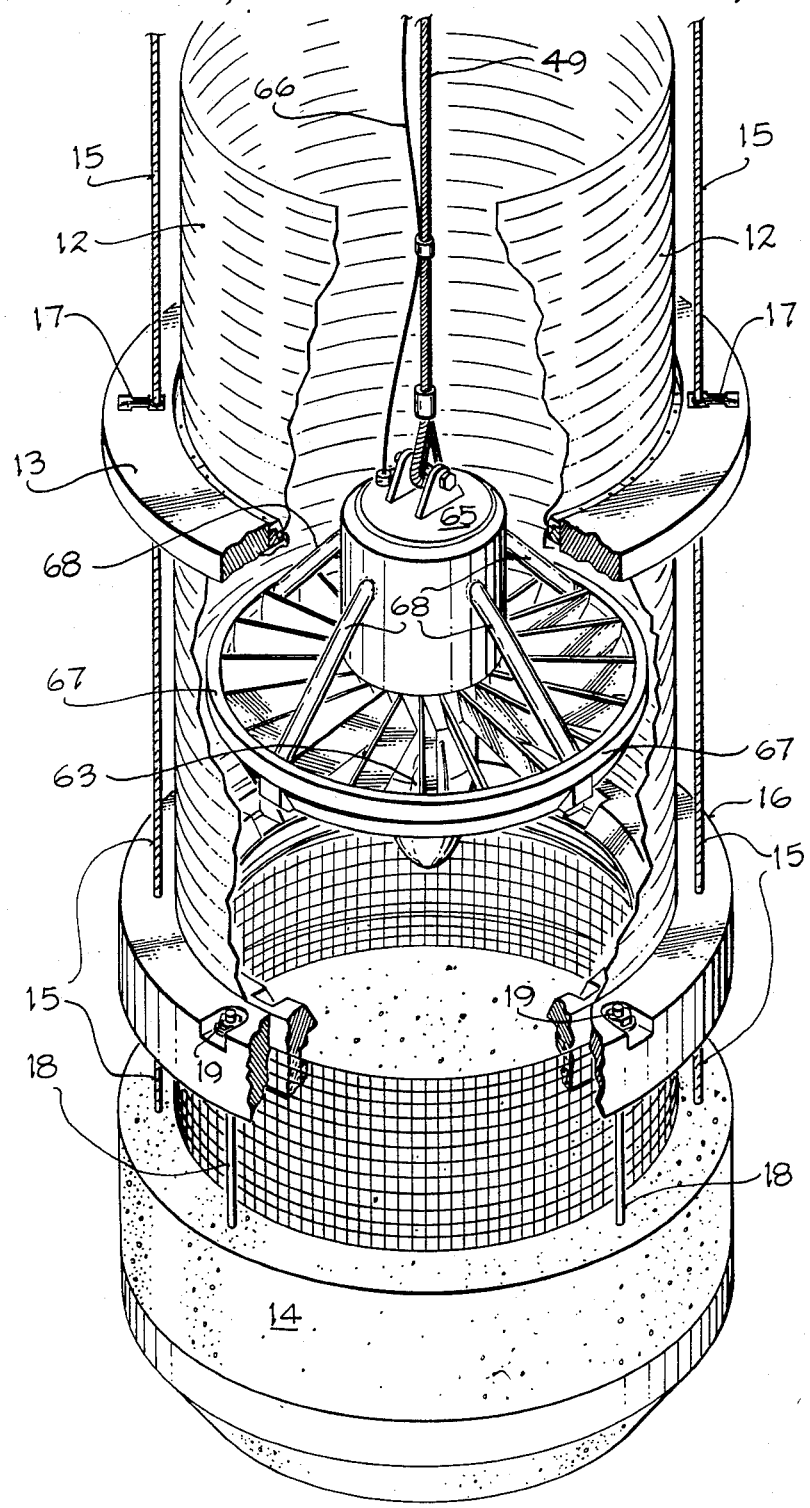
FIG_15

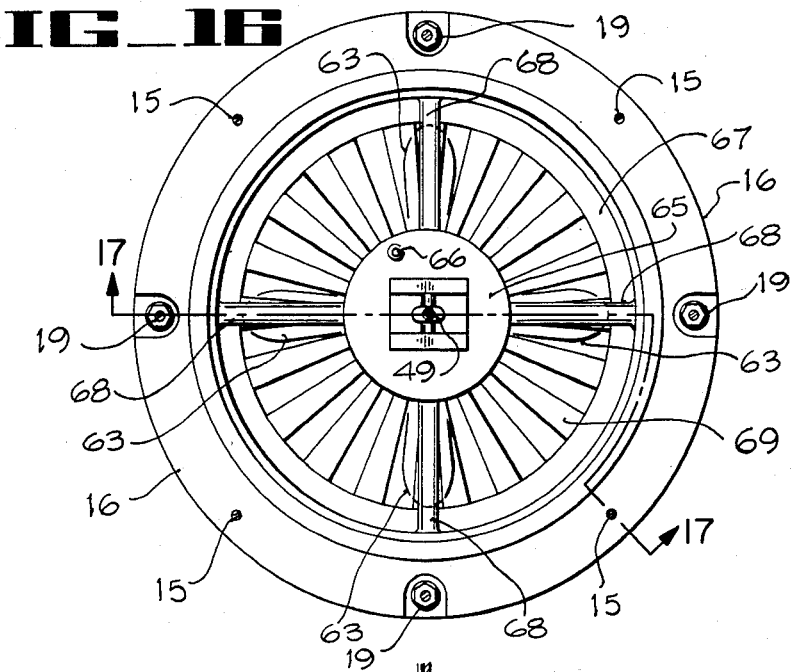
FIG_16
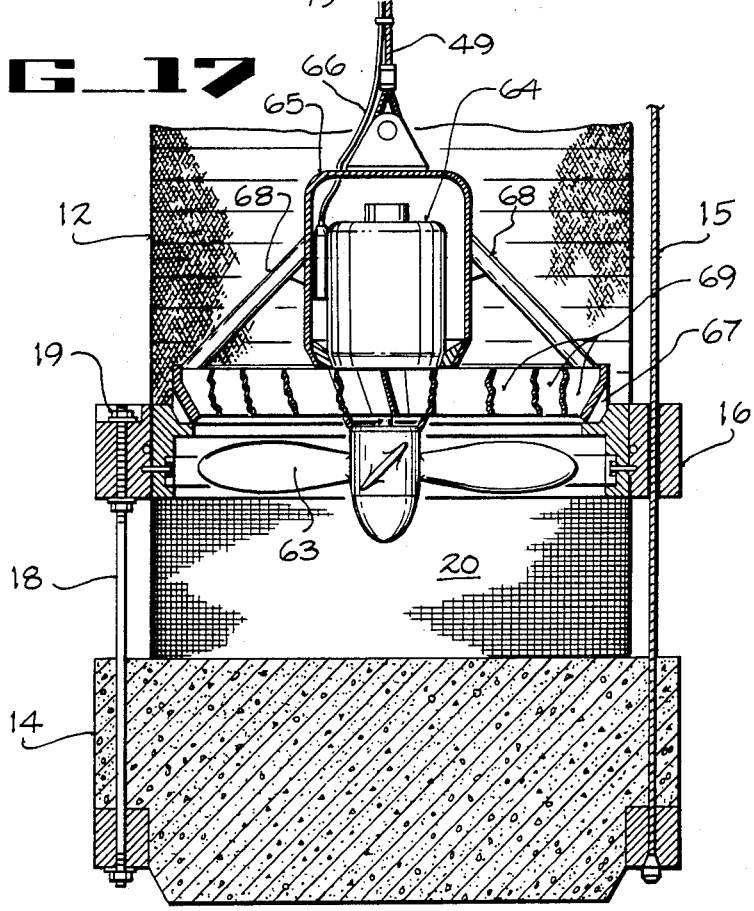
FIG_17

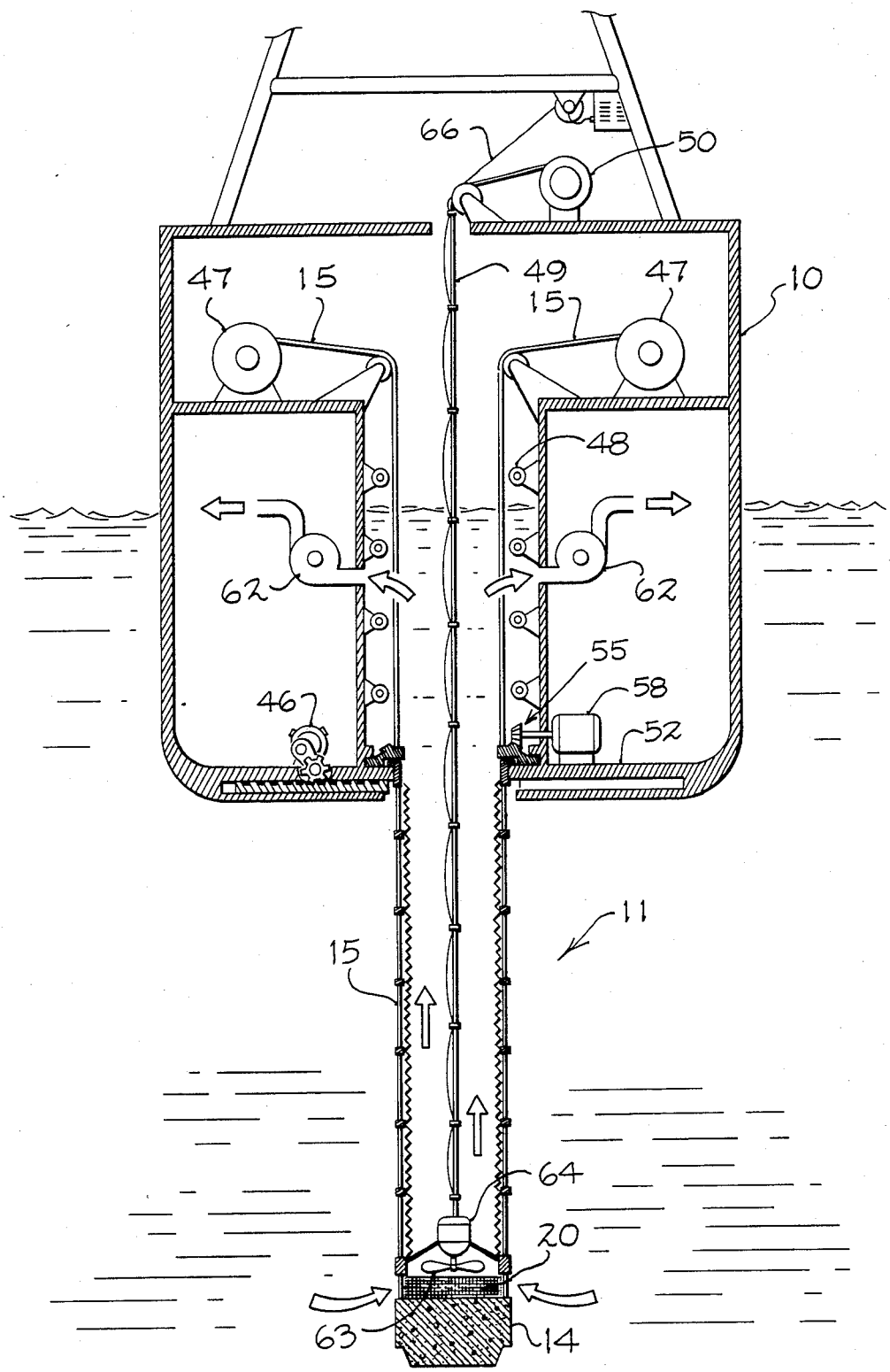

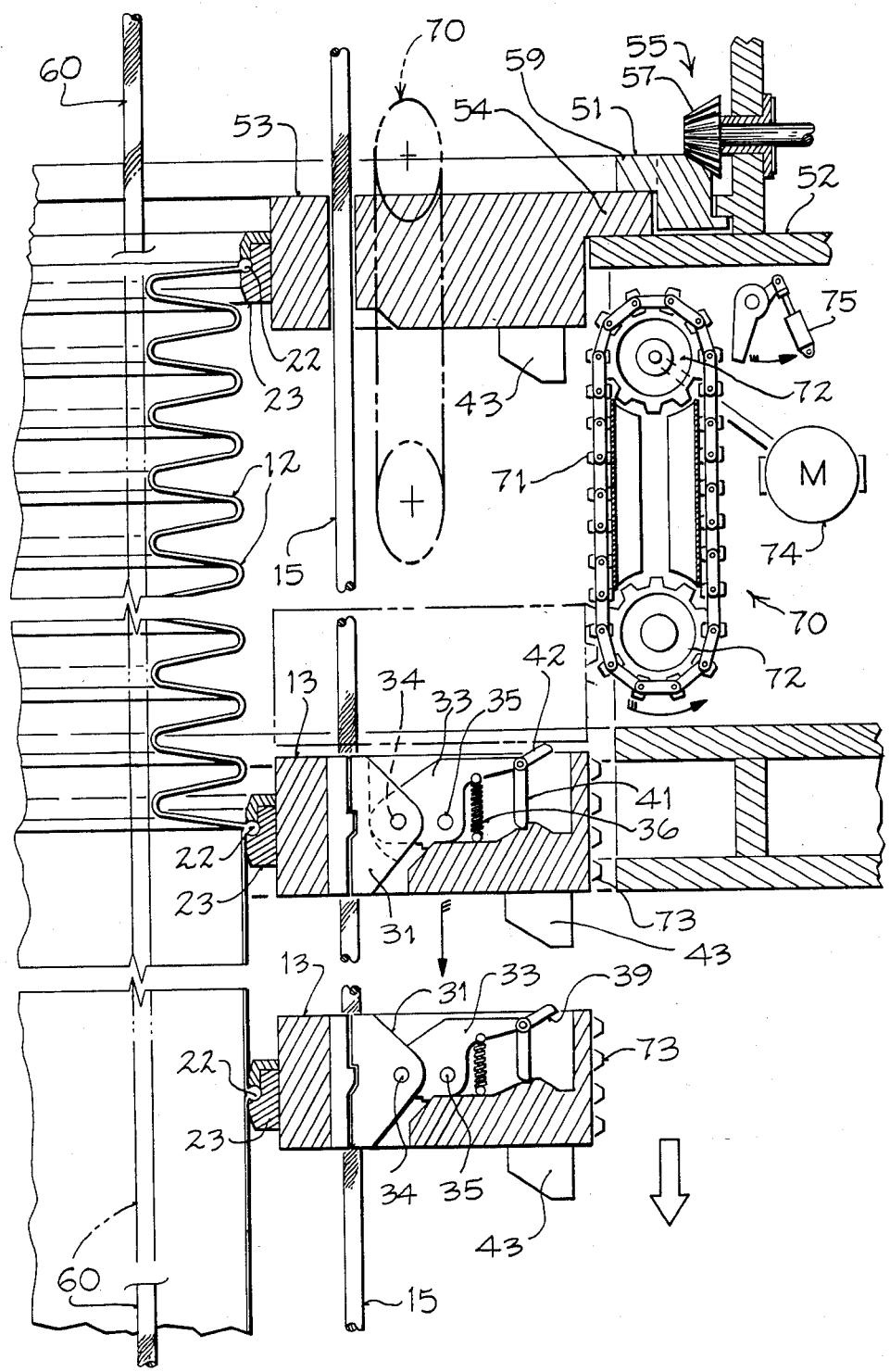
FIG_19

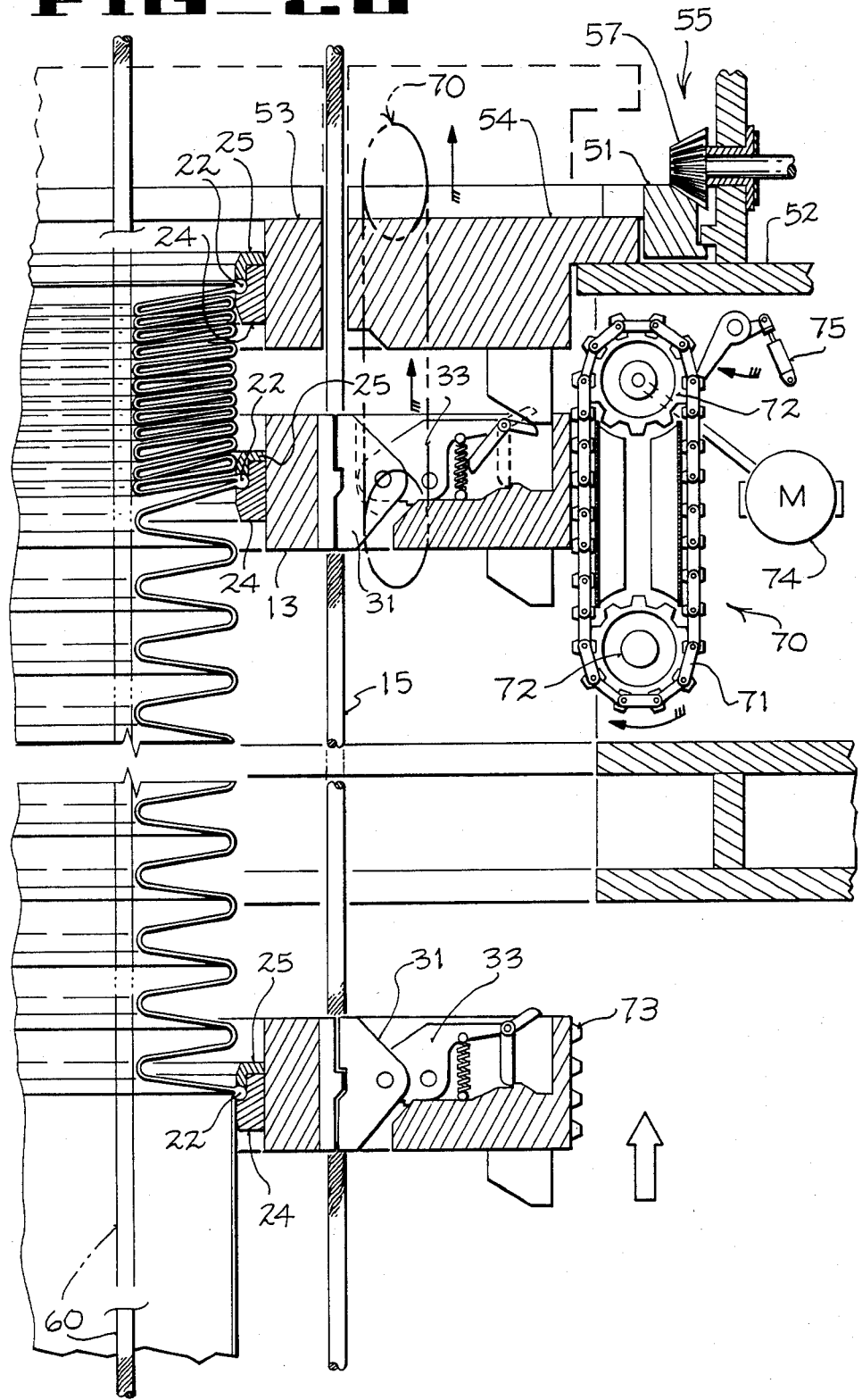

FLEXIBLE RETRACTABLE COLD WATER PIPE FOR AN OCEAN THERMAL ENERGY CONVERSION SYSTEM

TECHNICAL FIELD

This invention relates generally to ocean thermal energy conversion (OTEC) systems, and more particularly to cold water pipes for OTEC systems.

DESCRIPTION OF THE PRIOR ART

Ocean Thermal Energy Conversion (OTEC), which was first described by the French scientist A. d'Arsonval in 1881, aims to produce electricity by utilizing an essentially inexhaustible energy supply (the sun), a vast heat store (the surface region of the ocean), and a large-capacity heat sink (a deep region of the ocean).

A typical OTEC electrical power plant as described in the modern literature comprises a closed-loop thermodynamic system through which a working fluid (e.g., ammonia), which vaporizes at the temperature of the ocean surface, is circulated from an evaporator to a turbine, from the turbine to a condenser, and from the condenser back to the evaporator for recirculation through the system. The working fluid enters the evaporator in liquid phase, and is vaporized in the evaporator, which is immersed in relatively warm water drawn from the surface region of the ocean. The vaporized working fluid then passes to the turbine and gives up energy to the turbine, which drives an electrical generator. The working fluid exhausted by the turbine then passes to the condenser, which is maintained at the temperature of cold water drawn from a deep region of the ocean. Condensation of the working fluid to liquid phase occurs in the condenser. The condensed working fluid is thereupon pumped back to the evaporator to repeat the cycle.

An open-loop thermodynamic system has also been proposed in which warm sea water from the ocean surface is used as the working fluid. The warm water is vaporized at a pressure below atmospheric pressure, and is passed through the turbine to drive the electrical generator. The varporized water exhausted by the turbine is then condensed in a barometric condenser by cold sea water drawn from a deep region of the ocean.

Further details regarding OTEC systems are provided in an article entitled "Engineering Aspects of OTEC Systems," by Lloyd C. Trimble, published by the Society of Naval Architects and Marine Engineers in the Proceedings of the Spring Meeting in San Francisco, Calif., on May 25-27, 1977. Prototype OTEC electrical power plants have been built in Hawaii and in Nauru to demonstrate feasibility. To date, however, full-scale OTEC electrical power plants have not been built.

SUMMARY OF THE INVENTION

It is a general object of the present invention to provide a flexible retractable cold water pipe for an OTEC system.

It is a particular object of the present invention to provide a fabric cold water pipe that can be stowed on an OTEC operating vessel for transportation to a desired ocean site, deployed from the OTEC vessel to a desired ocean depth, and retracted to the OTEC vessel when necessary to survive adverse sea state conditions.

It is also a particular object of the present invention to provide cables and mechanisms for an OTEC system whereby a flexible retractable cold water pipe and its ballast can be supported during and after deployment to a desired ocean depth.

In accordance with a preferred embodiment of the present invention as described herein, an OTEC cold water pipe and associated handling equipment have been devised for drawing water to the surface of the ocean from a selected ocean depth. A proximal end of the cold water pipe is secured to a floating surface structure (e.g., a ship or a moored platform) on the ocean surface, and a distal end of the pipe is extendible into the ocean to the selected depth. The cold water pipe comprises a tubular fabric membrane surrounded by annular shaping rings to which the fabric membrane is attached. When the cold water pipe is stowed in the surface structure, and shaping rings form a stack of rings that are positioned one on top of the other, and the fabric membrane is folded in accordion fashion inside the stack of rings. When the cold water pipe is fully extended, the shaping rings are separated from each other at substantially equal intervals along the length of the fabric membrane. The shaping rings maintain the fabric membrane in circularly cylindrical configuration, and transfer the load of the cold water pipe to support cables when the cold water pipe is deployed.

An OTEC cold water pipe in accordance with the present invention can be used with a closed-loop or an open-loop thermodynamic system to bring large quantities of cold water to the surface of the ocean. Accordingly, the invention is not limited in applicability to any particular OTEC system.

DESCRIPTION OF THE DRAWING

FIG. 1 is a generalized representation of an OTEC system comprising a cold water pipe made of a tubular fabric membrane surrounded by annular shaping rings in accordance with the present invention.

FIG. 2 is a perspective view of the distal end of the cold water pipe included within line 2—2 of FIG. 1.

FIG. 3 is a fragmentary perspective view of a portion of the cold water pipe included within line 3—3 of FIG. 1.

FIG. 4 is a cross-sectional view along line 4—4 of FIG. 3 showing attachment of the fabric membrane of the cold water pipe to one of the surrounding shaping rings.

FIG. 5 is a cross-sectional view in partially cut-away perspective along line 5—5 of FIG. 3 showing a clamping device mounted on a shaping ring for engaging and disengaging a support cable.

FIG. 6 is a fragmentary perspective view of a portion of the clamping device of FIG. 5 showing a latch of the clamping device disengaged from the support cable.

FIG. 7 is a cross-sectional view along line 7—7 of FIG. 5 showing the latch of the clamping device engaging the support cable.

FIG. 8 is a cross-sectional view of the clamping device of FIG. 6 showing the latch of the clamping device disengaged from the support cable.

FIG. 9 is a transverse cross-sectional view of an OTEC vessel in which the cold water pipe of the present invention is shown in retracted position ready for deployment from a stowage chamber on the vessel.

FIG. 10 is a fragmentary perspective view of a bottom portion of the stowage chamber of the OTEC vessel of FIG. 9 in which the cold water pipe is shown leaving the stowage chamber.

FIG. 11 is a transverse cross-sectional view of the OTEC vessel and cold water pipe of FIG. 9 in which the shaping rings are buoyant, where the cold water pipe is shown after having left the stowage chamber but before beginning to extend to a selected ocean depth.

FIG. 12 is a fragmentary cross-sectional view of a proximal end portion of the cold water pipe of FIG. 11 nearing completion of deployment to the selected ocean depth.

FIG. 13 is a transverse cross-sectional view of the OTEC vessel and cold water pipe of FIG. 11 in which the vessel is shown in phantom, and in which a guiding device is shown in plan view within the cold water pipe for maintaining the fabric membrane of the cold water pipe in cylindrical configuration.

FIG. 14 is a fragmentary perspective view of a distal end portion of a guiding device as shown in FIG. 13.

FIG. 15 is a cut-away perspective view of the distal end of the cold water pipe shown in FIG. 2.

FIG. 16 is a cross-sectional view of the cold water pipe of FIG. 15 looking toward the distal end of the cold water pipe from a transverse plane intermediate the penultimate and ultimate shaping rings adjacent the distal end of the pipe.

FIG. 17 is a longitudinal cross-sectional view of the distal end of the cold water pipe along line 17—17 of FIG. 16.

FIG. 18 is a schematic representation of the OTEC system of FIG. 1 showing the flow of ocean water through the cold water pipe.

FIG. 19 is a fragmentary cross-sectional view of a proximal end portion of an alternative embodiment of said cold water pipe of the present invention in which the annular shaping rings surrounding the tubular fabric membrane are nonbuoyant, where the cold water pipe is shown nearing completion of deployment to the selected ocean depth.

FIG. 20 is a fragmentary cross-sectional view of the proximal end portion of the cold water pipe of the alternative embodiment of FIG. 19, where the cold water pipe is shown being retracted into the stowage chamber of the OTEC vessel.

BEST MODE OF CARRYING OUT THE INVENTION

In FIG. 1, a floating structure such as a ship 10 housing an ocean thermal energy conversion (OTEC) system is shown in station on the ocean surface over a deep region of the ocean. The OTEC system includes a conduit 11 (denominated a "cold water pipe") for drawing cold water from a selected ocean depth to the surface of the ocean. In accordance with the present invention, the OTEC cold water pipe 11 is flexible and retractable. Flexibility enables the pipe 11 to withstand motions of the ship 10 and of the surrounding water under very severe sea conditions. Retractability facilitates inspection, maintenance and repair of the pipe 11, and permits rapid withdrawal of the pipe 11 to the ship 10 when necessary to survive extreme sea conditions.

The cold water pipe 11 comprises a tubular membrane 12 made of a fabric such as a multiple-ply canvas, which is substantially impervious to flowing water. In principle, the fabric membrane 12 could be woven or otherwise formed as an integral sleeve-like structure extending many hundreds of feet (or perhaps several thousands of feet) in length. For practicability in fabrication, however, the fabric membrane 12 could comprise a plurality of adjoining or overlapping tubular segments. Attachment of adjacent membrane segments to each other could be accomplished by a conventional sewing or bonding technique. OTEC applications presently under consideration require that the cold water pipe 11 be capable of extending into the ocean to a depth on the order of 2500 feet, and have a diameter on the order of 30 feet.

As shown in FIG. 1 and in greater detail in FIG. 2, the cold water pipe 11 further comprises annular shaping members 13, which are configured as cylindrical rings that coaxially surround around the fabric membrane 12. In the preferred embodiment, the shaping rings 13 are buoyant. Preferably, each shaping ring 13 is configured as a shell made of a metal such as steel. Buoyancy can be provided by filling each shaping ring shell with a buoyant material such as a synthetic foam material. Alternatively, buoyancy can be obtained by manufacturing the shaping rings 13 so as to have watertight internal cavities. The shaping rings 13 are attached to the fabric membrane 12 at equally spaced intervals along the length of the pipe 11.

When the cold water pipe 11 is fully extended from the ship 10 to the desired ocean depth as illustrated in FIG. 1, the shaping rings 13 are vertically spaced apart from each other. For a deployed cold water pipe 11 of 2500 feet in length, the spacing between adjacent shaping rings could be, e.g., on the order of 30 feet. When the pipe 11 is fully retracted into a stowage chamber on the ship 10 (as illustrated in FIG. 9), the shaping rings 13 are drawn into contact with each other in a vertical stack so as to nest one on top of the another.

A ballast 14 is secured to the distal end of the cold water pipe 11 to insure that the pipe 11 assumes a generally vertical orientation when extended downward from the ship 10. The ballast 14 comprises a weighted object, preferably of generally cylindrical configuration, made of a dense material such as concrete. The ballast 14 and the cold water pipe 11 are supported by ligamentary members 15, which are preferably multistranded marine cables, extending downward from the ship 10 parallel to the pipe 11.

As indicated in FIG. 2, there is a plurality of support cables 15 suspended from the ship 10 at substantially equal circumferential intervals around the outside of the cold water pipe 11. The support cables 15 pass through aligned apertures in the annular shaping rings 13 and in a peripheral portion of the cylindrical ballast 14. The distal ends of the support cables 15, which pass through the ballast 14 and extend downward from the underside thereof, have screw-threaded terminations. Nuts (not visible in the perspective of FIG. 2, but seen in FIG. 17) are applied to the terminations on the distal ends of the support cables 15 to secure the ballast 14 to the support cables 15.

Each of the shaping rings 13, except the uppermost ring at the proximal end of the cold water pipe 11 (not visible in FIG. 2, but seen in detail in FIG. 10) and the lowermost or ultimate ring 16 adjacent the distal end of the pipe 11, is fitted with a plurality of clamping devices 17. There are as many clamping devices 17 on each shaping ring 13 (except on the proximal and distal end rings) as there are support cables 15 extending parallel to the pipe 11. In the embodiment illustrated in the drawing, there are four support cables 15, and hence there are four clamping devices 17 per shaping ring 13. The clamping devices 17 engage the support cables 15 when the cold water pipe 11 is fully extended, and are disengaged from the support cables 15 when the pipe 11 is retracted into the stowage chamber on the ship 10.

The clamping devices 17 are mounted in radially extending channels on the upper surface of each shaping ring 13 (except on the proximal and distal end rings, which have no feed for such surface channels). Apertures through each shaping ring 13 at the radially inboard ends of the respective channels accommodate passage of corresponding support cables 15 therethrough. Passage of the support cables 15 through the proximal and distal end rings is accommodated by similarly positioned apertures therethrough.

The ballast 14 is secured to the lowermost shaping ring 16 by vertically extending connecting rods 18, which (as shown in FIG. 2) are positioned at substantially equal circumferential intervals on the peripheral portion of the ballast 14. Preferably, each connecting rod 18 is positioned equidistant between two adjacent support cables 15. The upper ends of the rods 18 extend through the lowermost shaping ring 16, and the lower ends of the rods 18 extend through the peripheral portion of the ballast 14. Both ends of each rod 18 are screw-threaded. Nuts 19 secure the upper ends of the rods 18 to the lowermost shaping ring 16, and secure the lower ends of the rods 18 to the ballast 14. The nuts 19 on the lower ends of the connecting rods 18 are not visible in the perspective of FIG. 2, but can be seen in FIG. 17.

A cylindrical screen 20 is positioned coaxially with respect to the cold water pipe 11 between the lowermost shaping ring 16 and the ballast 14. The screen 20 provides entry for ocean water into the pipe 11, and prevents debris and marine life from being drawn up to the ship 10 along with the cold water that is being extracted from the ocean depth. The mesh of the screen 20 is preferably on the order of one inch. The screen 20 can be secured to the lowermost shaping ring 16 by conventional means, such as the technique described hereinafter in connection with the discussion of FIG. 15. The screen 20 can be secured to the ballast 14 by bolting.

A fragmentary portion of the cold water pipe 11 adjacent one of the shaping rings 13 is shown in perspective view in FIG. 3. Permanent folds or creases are shown running circumferentially around the tubular fabric membrane 12 at evenly spaced intervals along the pipe's length. These creases can be provided in the fabric by weaving, and facilitate folding of the fabric membrane 12 in a predetermined manner as the pipe 11 is being retracted. Alternatively, metallic rings could be attached to the tubular fabric membrane 12 at appropriately spaced intervals to initiate folding at the desired intervals along the pipe's length.

The fabric membrane 12 is attached to each of the surrounding shaping rings 13 in the manner illustrated in FIG. 4. At the level of each shaping ring 13 along the length of the cold water pipe 11, a corresponding rigid hoop 21 is inserted inside the flexible fabric membrane 12, and is positioned transversely with respect to the cylindrical axis of the tubular pipe 11. The hoop 21 has an inside diameter slightly larger than the nominal outside diameter of the fabric membrane 12, and could in principle be an integral structure. However, for convenience in manufacturing the cold water pipe 11, a plurality of arcuate hoop segments could be inserted individually inside the fabric membrane 12 at the level of each shaping ring 13, and could be assembled in place to form the completed hoop 21.

An outwardly extending bulge in the fabric membrane 12 is needed at the level of the surrounding ring 13 in order to accommodate the hoop 21. Preferably, the membrane fabric is not stretched by the hoop 21, but instead the bulge needed to accommodate the hoop 21 is pre-formed in the fabric. When the hoop 21 is in place in the bulge in the fabric, an outwardly extending flange 22 is thereby formed circumferentially around the outside of the tubular fabric membrane 12. There are as many hoops 21, and therefore as many flanges 22 around the fabric membrane 12, as there are shaping rings 13 surrounding the fabric membrane 12. The hoop 21 is preferably made of a non-abrasive material such as polytetrafluoroethylene (a material marketed under the trademark Teflon) in order to minimize wearing of the pipe fabric due to friction.

As shown in FIG. 4, an annular clamp 23 is attached to the interior surface of each of the shaping rings 13. The clamp 23 secures each ring 13 to the corresponding flange 22 extending outwardly from the fabric membrane 12. Each annular clamp 23 comprises a lower member 24 and an upper member 25, which when fitted together inside the shaping ring 13 form a bushing that separates the ring 13 from the fabric membrane 12 and substantially encases the flange 22. The lower clamp member 24 has a concave ledge portion, which is configured to conform to a major surface portion of the flange 22. Similarly, the upper clamp member 25 has a concave surface portion that is configured to conform to the greater part of the remaining surface portion of the flange 22.

In assembling the cold water pipe 11, the lower member 24 of each annular clamp 23 is first secured to the interior surface of the corresponding annular shaping ring 13 by recessed horizontal screws 26. The shaping ring 13 with the lower clamp member 24 attached thereto by the screws 26 is then positioned transversely around the tubular fabric membrane 12 at the level where the corresponding flange 22 is to be formed. The hoop 21 is then inserted inside the bulge in the fabric membrane 12 to form the flange 22, which rests on the concave ledge portion of the lower clamp member 24. The upper clamp member 25 is then placed inside the annular shaping ring 13 so as to mate with the lower clamp member 24, thereby retaining the flange 22 in a vise-like grip. The upper clamp member 25 is then secured to the lower clamp member 24 by horizontal and vertical screws 27, which are preferably positioned symmetrically around the clamp members 24 and 25. The horizontal screws 27 also secure the upper clamp member 25 and the lower clamp member 24 to the interior surface of the annular shaping ring 13.

The clamp members 24 and 25 bear against vertical portions of the membrane fabric in the vicinity of the flange 22. A fabric backing piece 28 configured as a sleeve segment can be inserted inside the fabric membrane 12 at the level of the flange 22 to reinforce the membrane fabric. The backing piece 28 is secured to the fabric membrane 12 by sewing. The clamp members 24 and 25 could be made of a metal such as steel, or alternatively could be made of a material such as polytetrafluoroethylene (Teflon).

The clamping devices 17 mounted on the shaping rings 13 are preferably of the type shown in FIG. 5. Each clamping device 17 is positioned in a corresponding radially extending channel 29 on the upper surface of the shaping ring 13. At the radially inboard end of the channel 29, a vertical shaft extends through the shaping ring 13 to form the aperture that accommodates passage of the support cable 15. The surface of the radially inboard end of the channel 29 is lined with a half-sleeve 30 made of an abrasion-resistant metal such as graphite-impregnated bronze to withstand friction with the support cable 15. The half-sleeve 30 is secured to the shaping ring 13 by conventional means, as by brazing.

The clamping device 17 comprises a movable latch 31, which is configured to mate with the stationary half-sleeve 30 to grip the cable 15. As shown in FIG. 5, and in isolated detail in FIG. 6, the half-sleeve 30 has a concave hemicylindrical surface portion extending parallel to the support cable 15. A detent 32 projects from each of the two longitudinal edges bounding the hemicylindrical surface portion of the half-sleeve 30. The latch 31 likewise has a concave hemicylindrical surface portion that extends parallel to the support cable 15. Each of the two longitudinal edges bounding the hemicylindrical surface portion of the latch 31 has a notch, which is configured to receive a corresponding one of the detents 32 on the half-sleeve 30.

As indicated in FIG. 5, the latch 31 has been moved rotationally downward into mating position with the half-sleeve 30 such that the detents 32 on the half-sleeve 30 are received in the corresponding notches on the latch 31. In this mating position, the half-sleeve 30 and the latch 31 together exert a vise-like grip on the support cable 15. The detents 32 prevent further downward motion of the latch 31 along the support cable 15, thereby preventing excessive compressional forces that might cut or otherwise damage the cable 15. When all the latches 31 on a particular shaping ring 13 are in the mating position shown in FIG. 5, the weight of that particular shaping ring 13 and the weight of the cold water pipe 11 are borne by the support cables 15. In the fragmentary view shown in FIG. 6, the latch 31 has been moved rotationally upward to a position away from the half-sleeve 30, thereby disengaging the clamping device 17 from the support cable 15.

The latch 31 has a slotted portion in which one end of a link member 33 is received. The link member 33 is attached to the latch 31 by means of a pin 34 extending transversely across the slotted portion of the latch 31. The pin 34 permits rotational motion of the latch 31 with respect to the link member 33. In the perspective of FIG. 5, downward (i.e., counterclockwise) rotational motion of the latch 31 about the pin 34 is seen to be limited by the detents 32 on the half-sleeve 30. Upward (i.e., clockwise) rotational motion of the latch 31 about the pin 34 is limited by the maximum range of motion permitted for the link member 33, as discussed hereinafter.

The link member 33 is mounted for rotational motion on an axle 35 extending transversely across the channel 29. The axle 35 is secured to the shaping ring 13 by conventional means. In an embodiment in which the shaping ring 13 is an integral structure, the opposite ends of the axle 35 could be brazed to corresponding opposite sides of the channel 29 in vertical keyways extending from the top surface of the ring 13 downward along the sides of the channel 29. In an alternative embodiment, the shaping ring 13 could be fabricated in arcuate segments. The ends of certain ones of these ring segments (or the ends of all the ring segments, where there are only as many ring segments as there are support cables 15) would be configured to mate with corresponding ends of other ring segments at the location of the support cables 15. These mating ends of two adjacent ring segments would be configured to form corresponding halves of one of the radially extending channels 29. When joined together, these two adjacent ring segments would produce the completed channel 29 internally configured as shown in FIG. 5.

In the alternative embodiment in which the shaping rings 13 are fabricated in arcuate segments, indentations could be provided in the opposite sides of the mating ends of adjacent ring segments. When the adjacent ring segments are fitted together to form the completed channel 29, these indentations in the opposite sides of the channel 29 would receive respective ends of the axle 35. In manufacturing this alternative embodiment, the link member 33 (with the axle 35 extending therethrough) would be positioned in the channel 29 as the adjacent ring segments are being fitted together.

As indicated in FIG. 7, the link member 33 is normally biased by a spring 36 to assume a rotational position about the axle 35 such that the latch 31 mates with the half-sleeve 30, thereby engaging the support cable 15. The spring 36 is preferably a helical compression spring, which is positioned coaxially around a straight pin 37. One end of the pin 37 is secured to the bottom of the channel 29 by hinge means 38, and the other end of the pin 37 is slidingly received within an elongate hole in a portion of the link member 33.

The normal bias of the spring 36 causes the link member 33 to rotate counterclockwise about the axle 35 until the detents 32 on the half-sleeve 30 engage the corresponding notches on the latch 31, thereby preventing further counterclockwise rotation of the link member 33. In that most counterclockwise position of the link member 33, the orientation of the pin 37 (and therefore of the helical spring 36) is substantially vertical. As the link member 33 is rotated clockwise from that most counterclockwise position, the pin 37 concomitantly rotates about the hinge means 38. The configuration of the link member 33 is such that the pin 37 enters slidingly into the hole in the link member 33 to a greater extent as the clockwise rotation of the link member 33 increases. The helical spring 36 undergoes greater compression concomitantly as the clockwise rotation of the link member 33 increases, until further clockwise rotation of the link member 33 is prevented as described hereinafter.

A cam 39 is pivotally attached by means of a pin 40 to the other end of the link member 33 opposite the latch 31, which is the end of the link member 33 adjacent the radially outboard end of the channel 29. The cam 39 is generally V-shaped with a long arm 41 and a short arm 42. The pin 40 passes through the cam 39 at the intersection of the two arms 41 and 42. As shown in FIG. 7, the rotational position of the link member 33 produced by the normal bias of the spring 36 causes the cam 33 to assume a rotational position relative to the link member 33 such that a long arm 41 has a generally vertical orientation. The bottom of the channel 29 is configured to intercept the tip of the long arm 41 so as to prevent counterclockwise rotation of the long arm 41 beyond the vertical position. The long arm 41, when in the vertical position, also prevents clockwise rotation of the link member 33 so that the latch 31 remains in mating contact with the half-sleeve 30. In summary, the normal bias of the spring 36 causes the long arm 41 of the cam 39 to assume an orientation such that the clamping device 17 engages the support cable 15.

Each shaping ring 13 has a protuberance 43 projecting downward from its underside. The protuberance 43 is configured to enter into the channel 29 on the shaping ring immediately underneath it, when the two vertically adjacent rings come into contact with each other. The penultimate shaping ring 13 adjacent the distal end of the cold water pipe 11 does not have a protuberance extending from its underside, since the ultimate or lowermost shaping ring 16 has no channel to receive such a protuberance.

In the view shown in FIG. 7, adjacent shaping rings 13 and 13' are approaching contact with each other. The protuberance 43' on the upper shaping ring 13' has not yet entered into the channel 29 on the upper surface of the shaping ring 13 underneath it. Consequently, the clamping device 17 on the shaping ring 13 is unaffected by the shaping ring 13' above it. The orientation of the cam 39 on the shaping ring 13 remains such that the clamping device 17 engages the support cable 15.

As the distance between the adjacent shaping rings 13 and 13' decreases (i.e., as the protuberance 43' on the ring 13' changes position with respect to the radially outboard end of the channel 29 on the ring 13 from the position shown in FIG. 7 to the position shown in FIG. 8), the protuberance 43' bears against the short arm 42 of the cam 39 on the shaping ring 13. As the protuberance 43' further enters the channel 29 on the shaping ring 13, the short arm 42 undergoes clockwise rotation about the pin 40 causing the long arm 41 to move away from its vertical position. Concomitantly, as the protuberance 43' further enters the channel 29, the link member 33 undergoes clockwise rotation about the axle 35 against the normal bias of the spring 36.

Clockwise rotation of the link member 33 continues until the shaping rings 13 and 13' have come into nesting contact with each other, as indicated in FIG. 8. Clockwise rotation of the link member 33 away from the position illustrated in FIG. 7 to the position illustrated in FIG. 8 causes the latch 31 to lift away from the half-sleeve 30, thereby disengaging the clamping device 17 from the support cable 15. The bottom of the channel 29 on the shaping ring 13 is configured to prevent further clockwise rotation of the cam 39 after the vertically adjacent shaping ring 13' has finally come into nesting contact with the shaping ring 13.

Relative motion of the shaping rings 13 and 13' in the direction indicated by considering FIGS. 7 and 8 in sequence causes the clamping device 17 on the shaping ring 13 to change from engagement with the support cable 15 to disengagement from the support cable 15. In like manner, relative motion of the shaping rings 13 and 13' in the opposite direction, as indicated by considering FIGS. 7 and 8 in reverse sequence, causes the clamping device 17 on the shaping ring 13 to change from disengaging the support cable 15 to engaging the support cable 15.

The shaping rings 13 are drawn up into nesting contact with each other when the cold water pipe 11 is stowed in the stowage chamber of the ship 10, as shown in FIG. 9. The fabric membrane 12 is folded in accordion fashion inside the stack of shaping rings 13, and the individual rings 13 are attached to the fabric membrane 12 in the manner shown in FIG. 4. The stowage chamber is a generally cylindrical space defined by vertical bulkheads 44 on the ship 10. When the cold water pipe 11 is stowed, a hatch 45 covers a generally circular opening in the hull of the ship 10 at the bottom of the stowage chamber. The hatch 45 can be moved to an open position by, e.g., a motor-driven rack-and-pinion mechanism 46 when the cold water pipe 11 is to be deployed. Opening of the hatch 45 allows seawater to flood the stowage chamber. Ocean water thereby surrounds the stack of shaping rings 13, and enters the interior of the stack through the screen 20.

The cables 15, which support the load of the deployed cold water pipe 11, are secured to winches 47 mounted on upper decks of the ship 10 as illustrated in FIG. 9. The winches 47 control descent of the cold water pipe 11 during deployment, and control ascent of the cold water pipe 11 during retraction into the stowage chamber. Bumpers or "stand-offs" 48 are provided on the bulkheads 44 to maintain the stacked shaping rings 13 in a vertical column that is spaced apart from the bulkheads 44. A propeller assembly, which functions as described hereinafter, is supported by a cable 49 extending vertically through the interior of the cold water pipe 11 from a winch 50 located on an upper deck of the ship 10. Operation of the winch 50 may be coordinated with operation of the winches 47 during deployment and retraction of the cold water pipe 11.

An annular frame 51 is mounted on an edge portion of a lower deck 52 of the ship 10 around a circular opening in the deck 52 aligned with the opening in the hull at the bottom of the stowage chamber. The annular frame 51 is mounted for rotational motion along the border of the circular opening in the deck 52, as described hereinafter. When the cold water pipe 11 is to be deployed, the hatch 45 is opened and the stowage chamber is thereby flooded with seawater entering through the opening in the hull. The winches 47 then lower the stack of shaping rings 13, with the ballast 14 attached to the lowermost shaping ring 16, into the ocean through the annular frame 51 as illustrated in FIG. 10.

In FIG. 11, the stack of shaping rings 13 is shown after having left the stowage chamber on the ship 10, but before any of the individual rings 13 have separated from each other. As seen in detail in FIG. 10, the annular frame 51 is provided with arcuately extending notches on its interior surface. The uppermost shaping ring (indicated by reference number 53) has arcuate detents 54 extending laterally outward therefrom. The detents 54 on the uppermost ring 53 are configured to pass through the notches on the frame 51, when the frame 51 is positioned so that the notches are aligned with the detents 54.

After the stack of shaping rings 13 (except the uppermost ring 53) has passed through the opening in the hull of the ship 10, the detents 54 on the uppermost ring 53 seat themselves on the edge portion of the deck 52 around the opening therein. Preferably, arcuate gasket strips made of a material such as felt are provided on the deck 52 to provide water-tight seating for the detents 54. The detents 54 prevent the uppermost ring 53 from passing through the opening in the deck 52, and thereby retain the proximal end of the cold water pipe 11 within the ship 10.

A bevel gear 55 controls the rotational motion of the annular frame 51 along the border of the circular opening in the deck 52. The bevel gear 55 comprises a rack 56 of arcuate configuration attached to the annular frame 51, and a pinion wheel 57 of truncated conical configuration positioned to mesh with the rack 56. The pinion wheel 57 extends from a drive-motor 58 mounted on the deck 52.

After the detents 54 on the uppermost shaping ring 53 have passed through the notches on the annular frame 51 and come to rest on the deck 52, the drive-motor 58 turns the toothed pinion wheel 57, which in turn moves the rack 56 through a predetermined arcuate distance along the periphery of the opening in the deck 52. The frame 51 to which the rack 56 is attached is thereby also rotated through the same arcuate distance, which is sufficient to cause inwardly extending flange portions 59 on the annular frame 51 cover the detents 54. In this way, the uppermost shaping ring 53 becomes locked in place at the bottom of the stowage chamber, as shown in FIG. 12.

In the embodiment of the invention as described thus far, the shaping rings 13 are buoyant. After the stack of shaping rings 13 and the ballast 14 (considered as a unit) have left the stowage chamber, and after the uppermost shaping ring 53 has been locked in place on the deck 52 at the bottom of the stowage chamber, the support cables 15 are then further let out to allow gravity to pull the ballast 14 downward. The lowermost shaping ring 16 to which the ballast 14 is rigidly attached is then pulled downward as gravity acting on the ballast 14 overcomes the buoyancy of the lowermost ring 16.

Since the penultimate shaping ring 13 is buoyant, and is not rigidly attached to the lowermost or ultimate shaping ring 16, gravity acting on the ballast 14 causes the ultimate shaping ring 16 to separate from the penultimate ring 13. This separation causes the accordion-pleated fabric between the ultimate ring 16 and the penultimate ring 13 to unfold. Eventually, the portion of the fabric membrane 12 between the ultimate and the penultimate shaping rings becomes taut, and assumes a circularly cylindrical configuration. Further downward motion of the ballast 14 due to gravity eventually causes a downward pull by the taut portion of the fabric membrane 12 on the penultimate shaping ring 13. The downward motion of the ballast 14 is controlled by the winches 47, which let out the support cables 15 at a slow enough rate to prevent excessive tension on the taut fabric between the ultimate ring 16 and the penultimate ring 13.

When the buoyant force on the penultimate shaping ring 13 has been overcome by the downward pull of the taut fabric between the ultimate ring 16 and the penultimate ring 13, the penultimate ring 13 separates from the shaping ring vertically above it, and the clamping devices 17 on the penultimate ring 13 immediately engage the support cables 15. This procedure continues in sequence for all of the shaping rings 13 from the distal end up to the proximal end of the cold water pipe 11, until all of the shaping rings 13 have engaged the support cables 15 and the cold water pipe 11 is fully extended to the desired ocean depth. The weight of the penultimate shaping ring 13 is then borne by the support cables 15. The portion of the fabric membrane 12 between any two adjacent shaping rings 13 never bears the weight of components of the cold water pipe 11 below the lower of those two adjacent shaping rings.

In the fragmentary view shown in FIG. 12, all the shaping rings 13 except the two shaping rings immediately below the uppermost ring 53 have already left the stack. The third-from-the-top shaping ring 13 has engaged the support cable 15, and is shown being lowered downward by the winches 47 until the portion of the fabric membrane 12 between the third-from-the-top shaping ring and the second-from-the-top shaping ring begins to unfold.

Also shown in the fragmentary view of FIG. 12 is a guide cable 60, which is suspended inside the tubular fabric membrane 12. As shown in detail in FIG. 13, a cage-like structure comprising a plurality of such guide cables 60 is suspended inside the tubular fabric membrane 12 from winch means (not visible in the drawing) mounted on an upper deck of the ship 10. The distal ends of the guide cables 60 are attached to an annular weighted object 61, which maintains the guide cables 60 in generally vertical orientation. FIG. 14 provides a fragmentary view of the weighted object 61 showing the distal ends of the guide cables 60 formed into loops, which fit over projections from the exterior surface of the weighted object 61. Nuts attached on screw-threaded ends of these projections secure the looped ends of the guide cables 60 to the weighted object 61.

Operation of the winch means for lowering the guide cables 60 and the attached weighted object 61 into the interior of the cold water pipe 11 may be coordinated with operation of the winches 47 and 50, so that the guide cables 60 can be deployed and retracted simultaneously with the cold water pipe 11. The cage-like structure comprising the guide cables 60 and the weighted object 61 prevents substantial lateral motion of the cold water pipe 11 when deployed, and also serves as a guiding device to facilitate folding of the membrane fabric in accordion-like fashion along predetermined creases during retraction of the cold water pipe 11.

The propeller assembly referred to earlier is shown in detail in FIG. 15. The propeller assembly comprises a multibladed propeller 63 secured to the shaft of a drive-motor 64 (not visible in FIG. 15, but seen in FIG. 17). The blades of the propeller 63 are configured generally as the blades of a ship's propeller, and rotate in a plane transverse to the axis of the cold water pipe 11. The drive-motor 64 is encased in a water-tight housing 65 attached to the distal end of the cable 49, which bears the weight of the propeller assembly. Electrical power to operate the drive-motor 64 is provided via a power cable 66, which runs parallel with and is preferably tied to the weight-bearing cable 49. The propeller 63 is positioned above the screen 20, and serves to pump water from the distal end of the cold water pipe 11 upward through the cold water pipe 11 to tanks on the ship 10.

A cylindrical frame 67 is suspended from the motor housing 65 by struts 68, which project downward at an angle from the vertical. Vanes 69 extend radially outward from a bottom portion of the motor housing 65 to the cylindrical frame 67. The top edges of the vanes 69 lie in a plane that is generally transverse to the axis of the cold water pipe 11, and the bottom edges of the vanes 69 lie in a plane generally parallel to the plane of the top edges. The vanes 69 are secured to the motor housing 65 and to the cylindrical frame 67 by conventional means, as by welding. The vanes 69 are positioned immediately above the propeller 63, and are slanted with respect to the vertical so as to counteract swirling of the water passing through the propeller 63. In this way, torque created in the cold water pipe 11 by the drive-motor 64 is counteracted, thereby preventing "wind-up" of the cold water pipe 11.

In FIG. 16, the vanes 69 and the blades of the propeller 63 are shown in a view looking downward from a plane transverse to the axis of the cold water pipe 11 between the distal end of the cable 49 and the penultimate shaping ring 13. The cage-like guiding device comprising the guide cables 60 and the annular weighted object 61 extends within the cold water pipe 11 coaxially with respect to the cable 49, which runs generally along the axis of the cold water pipe 11. The annular weighted object 61 is positioned above the cylindrical frame 67, and may rest on the struts 68 during retraction of the cold water pipe 11. When the cold water pipe 11 is in operation, it is preferable for the weighted object 61 to be freely suspended by the guide cables 60 above the struts 68 as shown in FIG. 17, in order to maintain tautness in the guide cables 60.

After the cold water pipe 11 has been deployed to the desired ocean depth, cold water entering the interior of the pipe 11 through the screen 20 is pumped upward through the pipe 11 to tanks on the ship 10 for use as a heat sink in an OTEC system. After absorbing heat in the OTEC process, this water is then expelled to the surface region of the ocean by conventional means, and is replaced by a continuous flow of cold water drawn from the ocean depth. Pumps 62 located on mid-decks of the ship 10 are shown in FIGS. 9 and 11 for drawing water from the ocean depth through the cold water pipe 11 into the stowage chamber and thence to tanks on the ship 10. A schematic illustration of the pumping procedure, which is begun after the cold water pipe 11 has been extended to the desired ocean depth, is shown in FIG. 18.

The shaping rings 13 in the embodiments described above were buoyant. In an alternative embodiment, the shaping rings 13 could be denser than water (i.e., nonbuoyant), in which case the procedures for deploying and retracting the cold water pipe 11 would be somewhat different. The deployment procedure for the case of nonbuoyant shaping rings 13 is illustrated in FIG. 19, which shows the annular frame 51 having already been rotated by the bevel gear 55 into position such that the inward flange portion 59 on the frame 51 has locked the uppermost shaping ring 53 in place on the deck 52. Separation of the shaping rings 13 from each other is shown to have proceeded in sequence from the lowermost ring 16, to the penultimate ring, and so on up the stack of rings 13, until finally the first-from-the-top shaping ring 13 was permitted to separate from the uppermost shaping ring 53.

Where all the shaping rings 13 are nonbuoyant, the entire stack of shaping rings 13 (except the uppermost ring 53) would fall as a unit with the ballast 14 when the support cables 15 are let out, unless some restraint were provided to overcome the pull of gravity acting on the shaping rings 13. Without such a restraint, the fabric of the tubular membrane 12 between the first-from-the-top shaping ring 13 and the uppermost shaping ring 53 would be stretched and would rip when the ballast 14 travels downward through a distance greater than the spacing between the first-from-the-top and the uppermost spacing rings. To restrain the downward passage of the shaping rings 13 out of the ship 10 as the ballast 14 is being lowered by the support cables 15, and to enable the individual shaping rings 13 to engage the support cables 15 in sequence from the bottom of the stack to the top of the stack, a restraining mechanism 70 (represented schematically by a chain gear device) is provided in the stowage chamber in the space between the deck 52 and the inside of the ship's hull.

As illustrated in FIG. 19, the chain gear device 70 comprises a chain 71 fitted over vertically aligned sprocket wheels 72 of equal diameter. The sprocket wheels 72 are mounted on one of the bulkheads 44, and are positioned so that the chain 71 can engage a vertically oriented rack of teeth 73 on the exterior surface of each of the shaping rings 13 as the shaping rings pass through the space between the deck 52 and the inside of the ship's hull. A plurality of symmetrically disposed chain gear devices 70 preferably at staggered vertical heights, as indicated in phantom outline in FIGS. 19 and 20, could be provided in the stowage chamber to bear the load of the stack of shaping rings 13 in the stowage chamber.

The deployment procedure for the embodiment of the cold water pipe 11 with nonbuoyant shaping rings 13 involves lowering of the ballast 14 and the attached lowermost shaping ring 16 through the opening in the ship's hull by means of the support cables 15, while controlling the descent of the stack of shaping rings 13 by means of the chain gear device 70. One of the sprocket wheels 72 is driven by a motor 74 at a rate of speed that determines the rate of rotation of the chain 71, which in turn determines the rate of descent of the stack of shaping rings 13 within the stowage chamber of the ship 10.

In FIG. 19, the chain 71 is shown travelling in a counterclockwise direction after having just released the first-from-the-top shaping ring 13 from the space between the deck 52 and the inside of the ship's hull. After the first-from-the-top shaping ring 13 has separated from the uppermost shaping ring 53, the clamping devices 17 on the first-from-the-top ring 13 engage the support cables 15, and the membrane fabric between the first-from-the-top ring 13 and the uppermost ring 53 begins to unfold from the accordion-pleated stowage configuration into the circularly cylindrical deployed configuration.

The function of the restraining mechanism represented by the chain gear device 70 is to release the shaping rings 13 one at a time from the bottom of the stack. Each succeeding shaping ring 13 is released when the immediately preceding shaping ring (which is secured to the support cable 15) has been lowered through a sufficient distance to cause the membrane fabric between the two shaping rings to unfold completely and become taut. Thus, operation of the motor 74 causing rotation of the chain 71 is coordinated with operation of the winches 47, which let out the support cables 15.

The chain 71 is rotated discontinuously. Considering, by way of example, a cold water pipe 11 in which the nonbuoyant shaping rings 13 are spaced apart from each other by 25 feet when deployed, the chain 71 could hold the stack of remaining shaping rings 13 stationary within the stowage chamber while the shaping ring that was just released travels downward for, say, 29 feet. As the just-released shaping ring reaches a position 29 feet under the ship's hull, the motor 74 then turns the chain 71 so as to move the next succeeding shaping ring into position for release from the bottom of the stack. Actual release of the next succeeding ring is timed to occur as the preceding ring reaches a position 30 feet under the ship's hull. In this way, successive shaping rings 13 engage the support cables 15 at equally spaced intervals of 30 feet. Coordination of the rotation of the chain 71 with the downward motion of the cables 15 can be accomplished by conventional techniques well-known in the maritime industry.

The procedure for retracting the cold water pipe 11 in the case of nonbuoyant shaping rings 13 involves unlocking the uppermost shaping ring 53 from the deck 52, and raising the support cables 15 so as to lift the entire cold water pipe 11 through the distance separating the first-from-the-top shaping ring 13 from the opening in the ship's hull. As shown in FIG. 20, the annular frame 51 has been rotated by the bevel gear 55 so that the detents 54 on the uppermost shaping ring 53 are aligned with the arcuate notches in the frame 51, thereby unlocking the uppermost shaping ring 53 from attachment to the deck 52. The support cables 15 then begin to lift the entire cold water pipe 11 as a unit. When the first-from-the-top shaping ring 13 reaches the stowage chamber on the ship 10, the teeth 73 on the exterior surface of the first-from-the-top ring 13 engage the chain 71. The support cables 15 continue to raise the cold water pipe 11 until the first-from-the top ring 13 comes into contact with the underside of the uppermost ring 53, which causes the clamping devices 17 on the first-from-the-top ring 13 to become disengaged from the support cables 15.

The chain 71 rotates in a clockwise direction, as shown in FIG. 20, as the first-from-the-top shaping ring 13 is raised up by the support cables 15 into contact with the underside of the uppermost shaping ring 53. A ratchet device 75, which may be secured to one of the bulkheads 44, is activated during the retraction procedure to prevent rotation of the chain 71 in the opposite (i.e., counterclockwise) direction. In this way, the chain gear device 70 supports the first-from-the top shaping ring 13 after the clamping devices 17 mounted thereon have become disengaged from the support cables 15.

With the first-from-the-top shaping ring 13 disengaged from the support cables 15, the cold water pipe 11 is further raised until the second-from-the-top shaping ring 13 enters the storage chamber and is brought into contact with the underside of the first-from-the-top shaping ring. The second-from-the-top shaping ring 13 thereupon disengages from the support cables 15, but is supported by the chain gear device 70. As the retraction procedure continues, more and more shaping rings 13 are brought into nesting contact with each other within the space between the deck 52 and the inside of the ship's hold. Eventually, the unlocked uppermost spacing ring 53 is raised from the deck 52, and the stack of shaping rings 13 is driven upward by the chain gear device 70 into the region of the stowage chamber above the deck 52.

As the individual shaping rings 13 are drawn into the stowage chamber on the ship 10, the fabric of the tubular membrane 12 folds in accordion-pleated fashion in the annular region between the interior surfaces of the shaping rings 13 and the exterior of the cage-like structure formed by the guide cables 60. After all the shaping rings 13 and the ballast 14 have been retracted into the stowage chamber, the hatch 45 can be moved to cover the opening in the ship's hull. The water in the stowage chamber can be removed by the pumps 62 for inspection and repair of the cold water pipe 11. Depending upon ship-handling considerations, the stowage chamber can optionally be flooded or evacuated during transit of the ship 10.

An OTEC system comprising a flexible, retractable cold water pipe for transferring ocean water from a selected ocean depth to a structure on the ocean surface has been described above in terms of particular embodiments. However, other embodiments would be apparent to workers skilled in the art upon perusal of the above description and accompanying drawing, and would be within the scope of the present invention. Therefore, the foregoing description and drawing are to be considered as illustrative of the invention, which is defined more generally by the following claims and their equivalents.

We claim:

1. An ocean thermal energy conversion (OTEC) system comprising:
   (a) a flexible conduit of generally tubular configuration, a proximal end of said conduit being secured to a surface structure and a distal end of said conduit being extendible from said surface structure to a selected ocean depth;
   (b) ballast means secured to said distal end of said conduit;
   (c) means for extending said distal end of said conduit from said surface structure to said selected ocean depth, and for retracting said distal end of said conduit from said selected ocean depth to said surface structure, said means for extending and retracting said distal end of said conduit including:
      (i) a plurality of cables, a proximal end of each cable being secured to winch means mounted on said surface structure, and a distal end of each cable being secured to said ballast means; and
      (ii) a plurality of annular shaping members coaxially surrounding said conduit, said shaping members being attached to said conduit at different locations between said proximal end and said distal end of said conduit, said annular shaping members including:
         (A) an uppermost shaping member attached to said conduit adjacent said proximal end of said conduit, said uppermost shaping member being securable to said surface structure when said distal end of said conduit is extended to said selected ocean depth, and
         (B) a lowermost shaping member attached to said conduit adjacent said distal end of said conduit;
   (d) a plurality of clamping devices mounted on each shaping member located intermediate said uppermost and said lowermost shaping members, each one of said clamping devices on each one of said intermediate shaping members being operable to engage a corresponding one of said cables when said distal end of said conduit is extended to said selected ocean depth; and
   (e) means for drawing water from said selected ocean depth through said conduit to said surface structure.

2. The OTEC system of claim 1 wherein said conduit is made of a textile fabric that is substantially impervious to flowing water.

3. The OTEC system of claim 2 wherein said textile fabric is canvas.

4. The OTEC system of claim 1 wherein said ballast means is secured to said distal end of said conduit by attachment to said lowermost shaping member.

5. The OTEC system of claim 1 wherein said shaping members are attached to an external surface of said conduit at substantially equally spaced intervals along said conduit.

6. The OTEC system of claim 1 wherein each one of said clamping devices on a particular one of said intermediate shaping members is mounted in a corresponding channel on a surface of said particular intermediate shaping member, said channel having an apertured portion extending through said particular intermediate shaping member to accommodate passage therethrough of said corresponding one of said cables.

7. The OTEC system of claim 6 wherein each one of said clamping devices comprises a latch that engages said corresponding one of said cables, said latch having a cylindrically concave portion that bears against said corresponding one of said cables when said distal end of said conduit is extended to said selected ocean depth.

8. The OTEC system of claim 7 having a plurality of cylindrically concave abrasion-resistant sleeves, each sleeve being secured in said apertured portion of a corresponding one of said channels, said latch on a corresponding one of said clamping devices mating with said sleeve secured in said apertured portion of said corresponding one of said channels when said latch bears against said corresponding one of said cables.

9. The OTEC system of claim 7 wherein said latch is spring-biased to engage said corresponding one of said cables when said distal end of said conduit is extended to said selected ocean depth.

10. The OTEC system of claim 1 having a plurality of rigid hoops positioned at different locations inside said conduit, said hoops causing annular portions of said conduit to extend radially outward, said shaping members being attached to said outwardly extending annular portions of said conduit.

11. The OTEC system of claim 10 wherein a radially inner portion of each one of said annular shaping members has a clamp attached thereto, said clamp comprising an upper member and a lower member, said upper and lower clamp members being configured to grip a corresponding outwardly extending annular portion of said conduit when said upper and lower clamp members are fitted together.

12. The OTEC system of claim 1 further comprising an elongate guiding device for maintaining said flexible conduit in generally circularly cylindrical configuration when said distal end of said conduit is extended to said selected ocean depth, a proximal end of said guiding device being secured to said surface structure and a distal end of said guiding device being extendible inside said conduit from said surface structure to a position adjacent said distal end of said conduit.

13. The OTEC system of claim 12 wherein said guiding device comprises a plurality of guide cables, a proximal end of each one of said guide cables being secured to winch means mounted on said surface structure, a distal end of each one of said guide cables being secured to an annular weighted object.

14. The OTEC system of claim 1 further comprising a propeller assembly positionable inside said conduit adjacent said lowermost shaping member when said distal end of said conduit is extended to said selected ocean depth.

15. The OTEC system of claim 1 further comprising a screen of generally cylindrical configuration attached to said lowermost shaping member and to said ballast means, said screen being positioned generally coaxially with respect to said conduit, said screen providing entry for water at said selected ocean depth into said conduit.

16. The OTEC system of claim 1 wherein said means for drawing water from said selected ocean depth through said conduit to said surface structure comprises pump means mounted on said surface structure.

17. The OTEC system of claim 1 wherein said shaping members are buoyant.

18. The OTEC system of claim 1 wherein said shaping members are nonbuoyant.

* * * * *